US012040568B2

(12) United States Patent
Li et al.

(10) Patent No.: US 12,040,568 B2
(45) Date of Patent: Jul. 16, 2024

(54) CONNECTOR WITH STAGGERED PIN ORIENTATION

(71) Applicant: Intel Corporation, Santa Clara, CA (US)

(72) Inventors: Xiang Li, Portland, OR (US); Konika Ganguly, Portland, OR (US); George Vergis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 17/128,803

(22) Filed: Dec. 21, 2020

(65) Prior Publication Data

US 2021/0151916 A1 May 20, 2021

(51) Int. Cl.

| | |
|---|---|
| ***H01R 13/6461*** | (2011.01) |
| ***H01R 12/70*** | (2011.01) |
| ***H01R 12/71*** | (2011.01) |
| ***H01R 13/24*** | (2006.01) |

(52) U.S. Cl.

CPC ..... *H01R 12/7076* (2013.01); *H01R 12/7082* (2013.01); *H01R 12/714* (2013.01); *H01R 13/2435* (2013.01)

(58) Field of Classification Search

CPC .............. H01E 12/7076; H01R 12/714; H01R 13/2435

See application file for complete search history.

(56) References Cited

U.S. PATENT DOCUMENTS

| | | | | |
|---|---|---|---|---|
| 8,641,449 B2 * | 2/2014 | Cai | .................... | H01R 13/6585 439/607.1 |
| 9,172,161 B2 * | 10/2015 | Walden | .............. | H01R 13/2435 |
| 10,490,951 B2 * | 11/2019 | Chang | .................. | H01R 12/716 |
| 10,522,949 B1 * | 12/2019 | Loffink | .............. | H01R 13/6471 |
| 2015/0372425 A1 | 12/2015 | Fazelpour et al. | | |
| 2019/0045632 A1 | 2/2019 | Li et al. | | |
| 2019/0245309 A1 * | 8/2019 | Lee | .................... | H01R 12/7076 |
| 2022/0149550 A1 * | 5/2022 | Maynard | .............. | H05K 7/1069 |
| 2023/0411907 A1 * | 12/2023 | Liao | .................. | H01R 13/6471 |

OTHER PUBLICATIONS

Extended European Search Report for Patent Application No. 21198614.6, Mailed Mar. 11, 2022, 8 pages.

* cited by examiner

*Primary Examiner* — Neil Abrams
(74) *Attorney, Agent, or Firm* — Akona IP PC

(57) ABSTRACT

Connectors with a staggered pin orientation can reduce crosstalk amongst signal pins. In one example, a connector to couple a card or module to a motherboard includes connector housing and a plurality of pins. Each of the plurality of pins includes two ends including a card or module-facing end to couple with the card or module and a motherboard-facing end to couple with the motherboard. Each of the plurality of pins includes a middle section in the connector housing. One or both of the ends include one or more bends relative to the middle section. The plurality of pins includes alternating signal pins and ground pins, wherein the signal pins having an opposite orientation relative to the ground pins.

20 Claims, 5 Drawing Sheets

CONNECTOR WITH STAGGERED PIN ORIENTATION

FIELD

The descriptions are generally related to connectors for coupling modules (such as memory modules) or devices with a printed circuit board such as a mother board, and more particularly, to connectors with a pin orientation that may enable a reduction in crosstalk.

BACKGROUND

Various technologies exist for connecting cards and modules with a printed circuit board (PCB) such as a motherboard. It is possible to couple electronic components directly to a motherboard, however, it is common to use a connector between the motherboard and the card or module to enable removably coupling the card or module with the motherboard.

Connectors typically have pins to couple with contacts on both the module and motherboard sides. Some pin configurations can result in significant crosstalk. For example, high frequency signal pins that are in close proximity may cause signal quality degradation due to crosstalk.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing at least one implementation of the invention that includes one or more particular features, structures, or characteristics. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

Connector pin orientation to reduce crosstalk is described herein. In one example, a connector includes rows of pins with a staggered orientation. For example, a connector to couple a card or module to a motherboard includes connector housing and a plurality of pins. Each of the plurality of pins includes two ends including a card or module-facing end to couple with the card or module and a motherboard-facing end to couple with the motherboard. Each of the plurality of pins includes a middle section in the connector housing, wherein one or both of the ends include one or more bends relative to the middle section. The plurality of pins includes alternating signal pins and ground pins, wherein the signal pins having an opposite orientation relative to the ground pins.

Figure 1A:
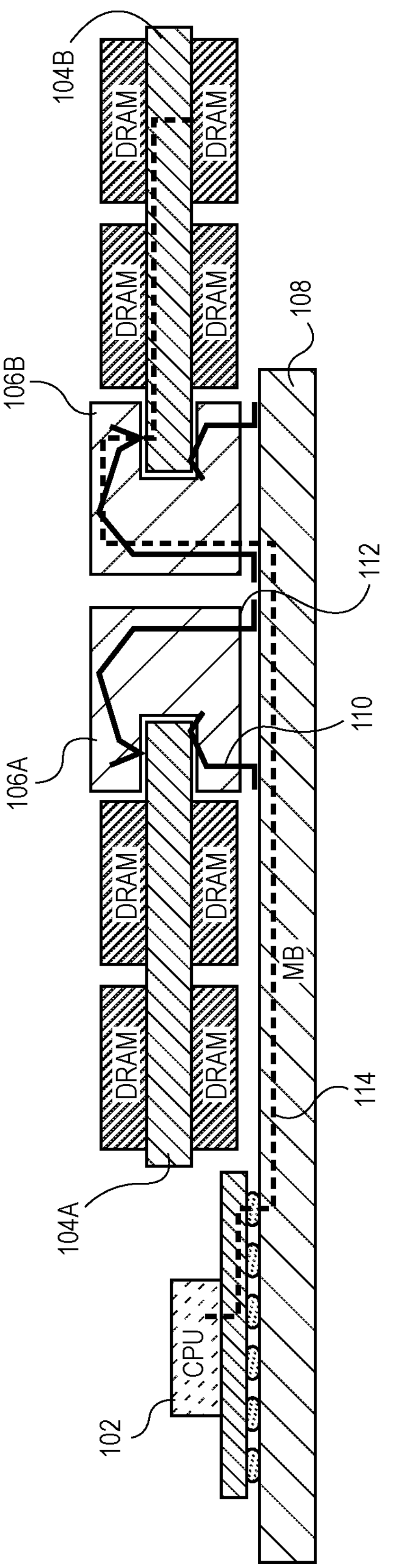
FIG. 1A illustrates an example of a DDR5 SODIMM connector configuration.

FIG. 1A illustrates an example of a DDR5 (Double Data Rate, version 5) SO-DIMM (small outline dual in-line memory module) connector configuration in a system. The conventional SO-DIMM configuration shown in FIG. 1A may typically be used for client platforms. As illustrated in FIG. 1A, a CPU 102 and SO-DIMMs 104A and 104B are coupled with a motherboard 108. Each of the SO-DIMMs has a plurality of DRAM chips mounted on the PCB of the SO-DIMM. The SO-DIMMS 104A and 104B are installed in a direction parallel to the motherboard 108 via the connectors 106A and 106B. Each connector 106A and 106B includes a row of bottom pins 110 and a row of top pins 112. The two rows of pins are also known as the front and back rows, referring to which face of the DIMM the pins are to make contact with. The row of bottom pins makes contact with a row of contacts on one face of the SO-DIMM. The row of top pins makes contact with a row of contacts on the opposite face of the SO-DIMM. Signals between the CPU 102 and the SO-DIMMs 104A and 104*b* are transmitted through contacts between the CPU 102 and the motherboard 108, through traces in or on the motherboard 108, through the pins 110 and 112, and through traces in or on the SO-DIMM. The dotted line 114 shows an example of a path of a signal between the CPU 102 and the SO-DIMM 104B.

The configuration shown FIG. 1A is sometimes referred to as a butterfly configuration. In the butterfly configuration, the shape of the top pins 112 have a different shape than the bottom pins 110. The bottom or lower pins are shorter and the top pins are longer. The longer top pins may be more susceptible to crosstalk issues than the shorter bottom 110 pins.

Figure 1B:
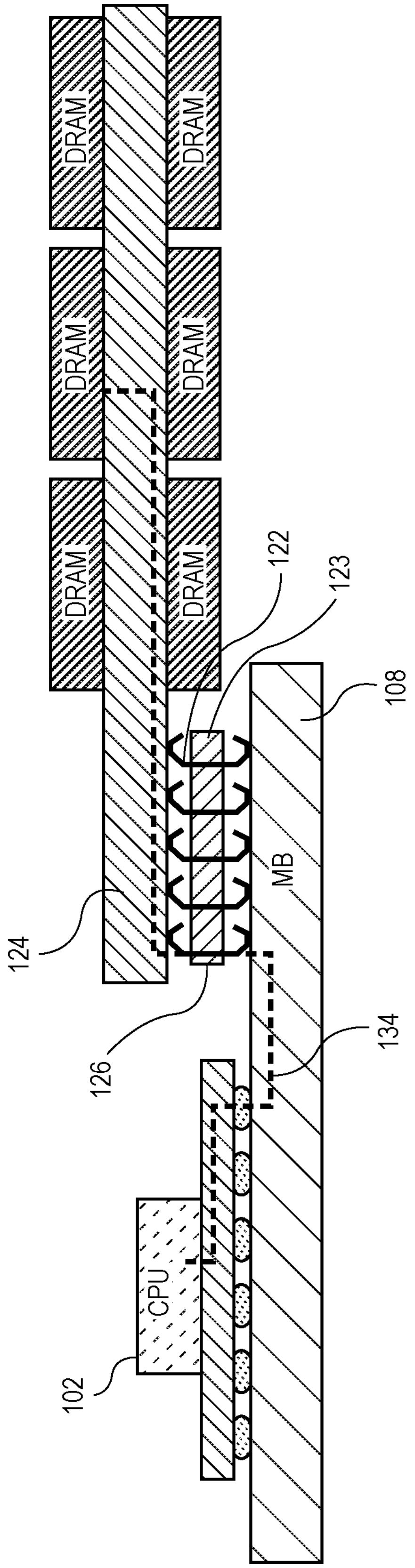
FIG. 1B illustrates an example of a compressed footprint DIMM connector.

FIG. 1B illustrates an example of a compressed footprint DIMM connector. The compressed DIMM connector has a smaller footprint compared to a standard DDR5 connector. As illustrated in FIG. 1B, a CPU 102 and a DIMM 124 are coupled with a motherboard 108. The DIMM 124 has a plurality of DRAM chips mounted on the PCB of the DIMM. In the illustrated example, the DIMM may have a compressed size (a compressed DIMM). In the example illustrated in FIG. 1B, the DIMM 124 is installed in a direction parallel to the motherboard 108 via the connector 126 (e.g., via a right angle insert). Therefore, the connector 126 could be referred to as a right angle connector. The dotted line 134 shows an example of a path of a signal between the CPU 102 and the DIMM 124.

Unlike the connector of FIG. 1A, the pins 122 have a consistent shape. The pins 122 are housed in connector housing 123. The footprint of the connector on the motherboard is smaller than conventional connectors, such as the connectors 106A and 106B of FIG. 1A. The pins 122 of the compressed connector are also shorter relative to the pins 112 of FIG. 1A, which may result in less crosstalk in the compressed connector. However, the pins of the compressed connector 126 are close together, resulting in additional sources of crosstalk compared to the conventional SO-DIMM connector. As mentioned above, the conventional SO-DIMM connector of FIG. 1A has two rows of pins, a front row and a back row. Therefore, the aggressors typically come from the same side or face. An aggressor refers to the source of crosstalk, which impacts a victim. For example, a signal pin may be an aggressor causing crosstalk that impacts a nearby signal pin (the victim). Furthermore, because the pins of the conventional SO-DIMM connector are arranged as two rows, each pin would typically have at most two aggressors (e.g., the closest signal pins in the row).

Figure 2:
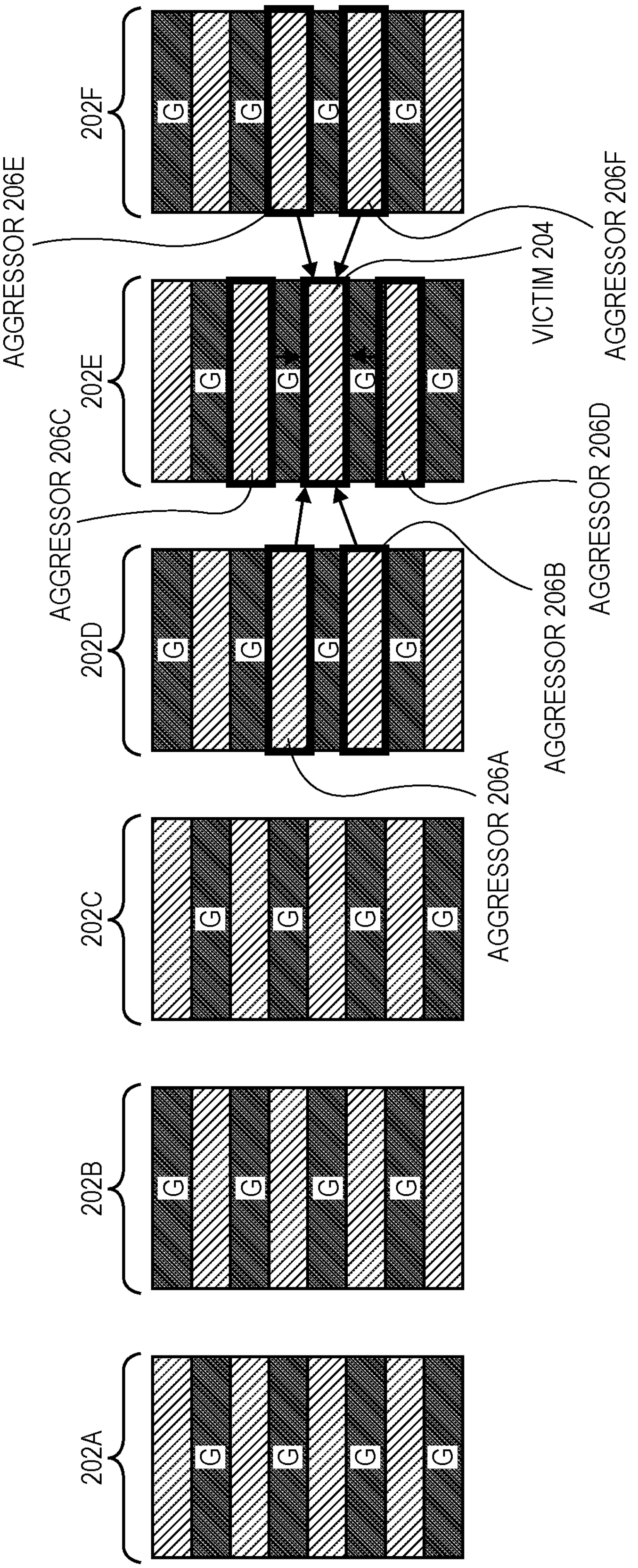
FIG. 2 shows an example pinout for a compressed DIMM connector design.

In contrast, the pins 122 of the connector 126 are arranged in multiple rows in close proximity, resulting in some pins having more than two aggressors. FIG. 2 shows an example pinout for a compressed DIMM connector design. The connector pinout shown in FIG. 2 illustrates multiple rows 202A-202F of pins. Specifically, the example in FIG. 2 shows six rows 202A-202F of eight pins each. The multiple rows of pins may also form a grid of pins. The pins in the rows are alternating ground and signal pins; however, there may also be one or more rows with signal pins that are adjacent to one another and not separated by a ground pin. Signal pins include pins for transmission of a signal, such as a data signal (e.g., data bus signal (DQ), data strobe (DQS), command and address bus signal (CA), or other I/O signal). Ground pins are for coupling with ground. As can be seen in this example, a signal pin can be the victim of more than two aggressors causing crosstalk. For example, the victim signal pin 204 is impacted by the aggressor signal pins 206A-206F on the top, bottom, and sides. Therefore, crosstalk in a compressed DIMM configuration can be worse than in conventional DIMM connectors in which there are two rows of pins.

Figure 3:
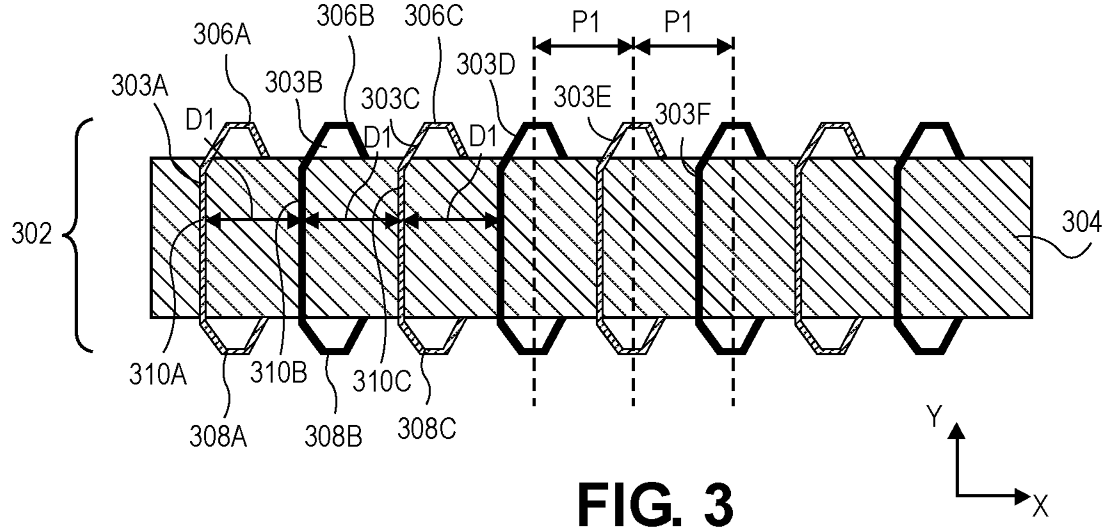
FIG. 3 illustrates an example of a row of C-shaped connector pins with the same orientation.

FIG. 3 illustrates an example of a row of C-shaped connector pins 303A-303F with the same orientation. FIG. 3 shows a row 302 of pins in connector housing 304. The row 302 of pins includes alternating ground and signal pins. Each pin has a middle section between two ends. For example, the pin 303A has a middle section 310A between a top end 306A and a bottom end 308A. The pin 303B has a middle section 310B between a top end 306B and a bottom end 308B. Similarly, the pin 303C has a middle section 310C between a top end 306C and a bottom end 308C. Each of the pins in FIG. 3 is bent on the top and bottom ends. For example, the pin 303A has a top end 306A and a bottom end 308A that are both bent in the same direction. The ends of the pins in FIG. 3 include three bends to create a C-shape. In the example of FIG. 3, the top half and bottom half of each pin is identical.

The spacing between pins is the same. Therefore, the pins have a consistent pitch P1. The pitch of pins in a row is the distance between adjacent pins along an axis of the row. The pitch is typically measured from a mid-point of the pins. For example, the pitch P1 between the pin 303D and the pin 303E is the same pitch P1 between the pin 303E and the pin 303F. Because the shape and orientation of the pins is the same, the middle sections of the pins are also spaced evenly. For example, the distance D1 between the pin 303B and an adjacent pin 303C is the same as the distance D1 between the pin 303B and the pin 303C.

The connector pins of FIG. 3 all have the same orientation. For example, the pins are all facing the same direction along the axis of the row (e.g., the x-axis in FIG. 3). If two identically-shaped pins have the same orientation, it means that the bends in the first pin protrude or extend in the same direction as the corresponding bends in the second pin. For example, the top end 306A extends away from the middle section 310A in the same direction as the top end 303B from the middle section 310B.

Figure 4:
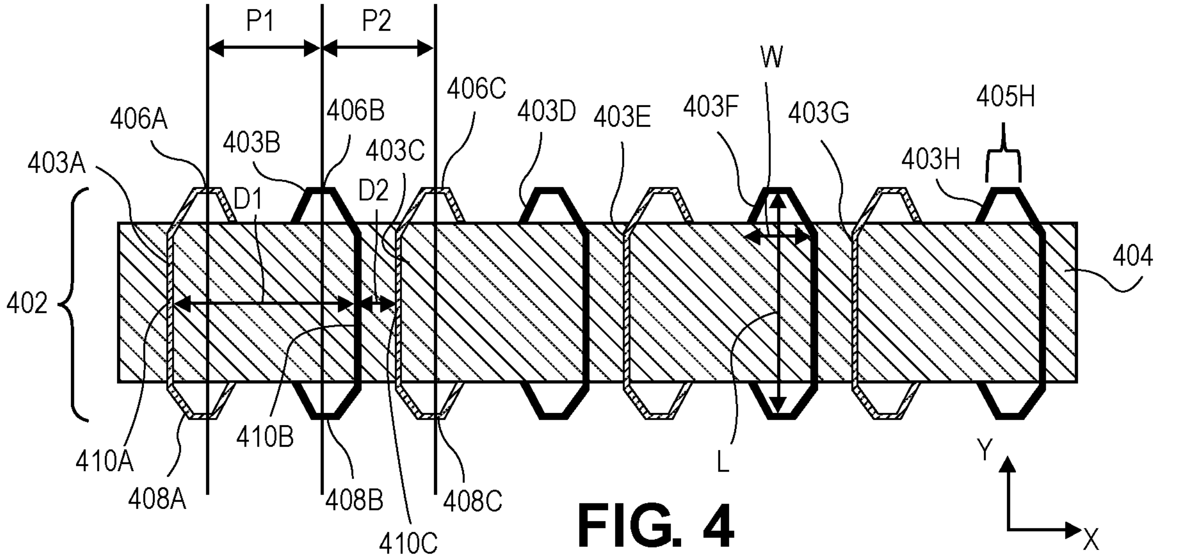
FIG. 4 illustrates an example of a row of C-shaped connector pins with a staggered pin orientation.

FIG. 4 illustrates an example of a row of C-shaped connector pins with a staggered pin orientation. FIG. 4 shows a row 402 of pins in a connector housing 404. The row 402 of pins includes alternating ground and signal pins. For example, the row 402 of pins includes signal pins 403A, 403C, 403E, and 403G and ground pins 403B, 403D, 403F, and 403H. Therefore, the signal and ground pins are alternating or interleaved such that every other pin is a signal pin. In the illustrated example, eight pins are shown in a row 402; however, other implementations may include fewer or a greater number of pins than eight. In one example, the signal pins include single-ended input/output (I/O) pins. Single-ended I/O pins may experience more significant signal deterioration due to cross-talk compared to differential signal pins. However, differential signal pins may also benefit from the connector pin orientation described herein.

Each pin has a middle section between two ends. For example, the pin 403A has a middle section 410A between a top end 406A and a bottom end 408A. The pin 403B has a middle section 410B between a top end 406B and a bottom end 408B. Similarly, the pin 403C has a middle section 410C between a top end 406C and a bottom end 408C. In one example, the top end couples with a card or module (or other device to be installed into the connector). Therefore, the top ends of the pins may be referred to as the card or module-facing ends. Examples of card or modules that may be installed in a connector with a staggered pin orientation include: a memory module (such as a dual-in line memory module (DIMM)), a graphics card, an accelerator, or other device to couple with a motherboard via signal pins in a connector. The bottom ends couple with a PCB, such as a motherboard. Therefore, the bottom ends of the pins may be referred to as the motherboard-facing ends. Each of the pins in FIG. 4 is bent on both the top and bottom ends.

In the illustrated example, the top end and bottom end of each pin both bend away from the middle section in the same direction. For example, the pin 403A has a top end 406A and a bottom end 408A that are both bent in the same direction away from the middle section 410A. In the illustrated example, the bends in the pin result in a C-shaped pin. In one example, the length of each of the plurality of pins is greater than width of the pin. For example, the length L of the pin 403F is greater than the width W of the pin. In an example of a pin with a substantially straight middle section, the width of the pin may be the same as the distance between the further point of the ends of the pins from an axis along the middle section of pin and the axis along the middle section. Wider pins with ends that extend further from the middle section may benefit more from the staggered orientation shown in FIG. 4. For example, pins in which the distance of the ends from the axis is between 10-50% of the length of the pin may experience more crosstalk reduction than a narrower pin.

In the illustrated example, the plurality of pins 403A-403H have identical shapes. Additionally, in the example of FIG. 4, the top half and bottom half of each pin is identical. However, other implementations may have different shapes, bends, angles, or other features at the bottom and top ends of the pins. For example, the bottom end of the pin may have a different shape for coupling with a pad or through hole on a motherboard than the top end for coupling with a pad or other contact on a module. The ends of the pins in FIG. 4 include three bends; however other pins may have a different number of bends at their ends (e.g., one, two, four, or more than four bends).

In the illustrated example, one or both of the ends of each of the plurality of pins include a flat section parallel to the motherboard (in this example, the plane of the motherboard is along the x-axis and z-axis (not shown), which would be going into and out of the page). For example, the pin 403H includes a flat section 405H parallel to the x-axis and parallel to the motherboard. The pins illustrated in FIG. 4 include straight or vertical middle sections that are orthogonal to the motherboard. For example, the middle section 410A is straight and orthogonal to the motherboard. In one example, the middle section of a pin is parallel to the middle section of the other pins of the plurality.

Figure 5:
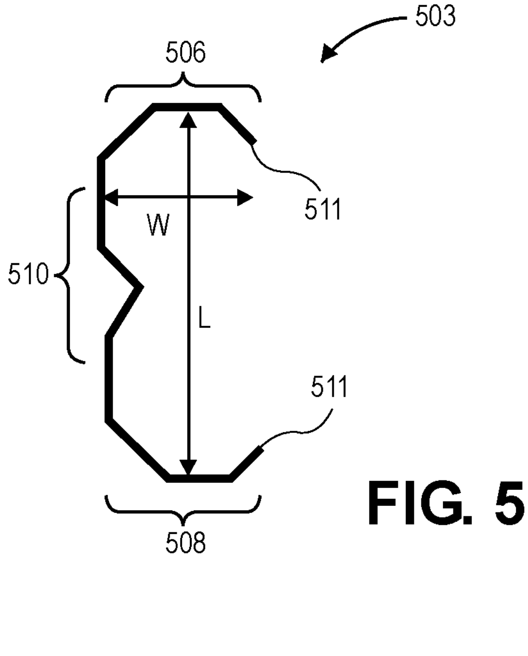
FIG. 5 is an example of a C-shaped pin.

The bends in the pin (either at the ends or in the middle section) may result in curves or protuberances away from an axis along the length of the pin. Although the middle sections of the pins in FIG. 4 are straight and have no bends or curves, the middle sections may also (or alternatively) include one or more curves, protrusions, bends, or protuberances. The middle sections of the pins may include both a straight section and one or more curves, protrusions, bends, or protuberances. FIG. 5, discussed below, illustrates a pin with curved or bent middle section.

The spacing between pins is the same. Therefore, the pins have a consistent pitch P1. The pitch of pins in a row is the distance between adjacent pins along an axis of the row. The pitch is typically measured from a mid-point of the pins. For example, the pitch P1 between the pin 403A and the pin 403B is the same pitch P2 between the pin 403B and the pin 403C. In another example, there may also be a varied or staggered pin pitch. For example, some implementations may have a different pitch between adjacent pairs of pins (e.g., P1<P2 or P1>P2). Although only one row of pins is illustrated in FIG. 4, the plurality of pins may include multiple rows (e.g., two rows, more than two rows (e.g., 3-8 rows or more than 8 rows)) of spaced pins.

Unlike the pins in FIG. 3, the pins in FIG. 4 have a staggered orientation. For example, the signal pins 403A, 403C, 403E, and 403G have an opposite orientation relative to the ground pins 403B, 403D, 403F, and 403H. The staggered orientation results in each pair of adjacent pins having an opposite orientation along the axis of the row (e.g., along the x-axis in FIG. 4). A pin and the adjacent pin in the row have orientations that are mirrored across the axis orthogonal to the motherboard (e.g., along the y-axis in FIG. 4). The staggered orientation causes the middle section of a pin in a row to be closer to the middle section of a first adjacent pin in the row than the middle section of a second adjacent pin in the row. For example, the middle section 4108 of the pin 403B is closer to the middle section 410C of the pin 403C than the middle section 410A of the pin 403A. Thus, for each pin that has two adjacent pins in the row (a pin on each side in the row), the distance between the middle section of the pin and the middle sections of the adjacent pins will be different.

As shown in FIG. 4, the distance D2 is less than the distance D1. The difference in distances between middle sections could also be referred to as the pitch of the middle sections. In one example, the pitch is the same for the row of pins measured from a midpoint of the pins (e.g., P1=P2), the staggered orientation results in the middle sections having a staggered pitch. For example, the pitch between the middle section of the pin and the middle section of one adjacent pin is different than the pitch between the middle section of the pin and the middle section of another adjacent pin. In this way, the majority of the signal pin's length is closer to the adjacent ground pin, resulting in crosstalk reduction. An additional benefit to the staggered pin orientation is that the staggered orientation balances the horizontal force when mounting the connector; the lateral forces from the pins cancel each other out to keep the connector in a fixed position on the motherboard.

Thus, the connector pins in FIG. 4 show an example of connector housing 404, and a plurality of pins 403A-403H at least partially in the connector housing 404. Each of the plurality of pins 403A-403H includes two ends including a card or module-facing end to couple with a card or module and a motherboard-facing end to couple with a motherboard. Each of the plurality of pins 403A-403H includes a middle section in the connector housing 404, wherein the ends of each of the plurality of pins bend away from the middle section. The plurality of pins includes alternating signal pins and ground pins, where the signal pins have an opposite orientation relative to the ground pins. By bringing the length of the signal pin closer to the length of an adjacent ground pin, crosstalk can be significantly reduced.

FIG. 5 is an example of a C-shaped pin. The pin 503 is similar to the pins of FIG. 4 in that the pin 503 has a C shape with bends at both the top end 506 and the bottom end 508. The pin 503 differs from the pins in FIG. 4 due to the middle section 510 including bent sections. The bends in the pin cause the middle section 510 to protrude towards the tips 511 of the pin. In one example in which there is one or more protrusions in the middle section, one or both ends of the pins extends further from an axis of the middle section than any protrusion in the middle section. Thus, although the middle section 510 of the pin 503 includes some bent or non-straight sections, the middle section is substantially straight relative to the ends that extend away from the middle section.

Figure 6:
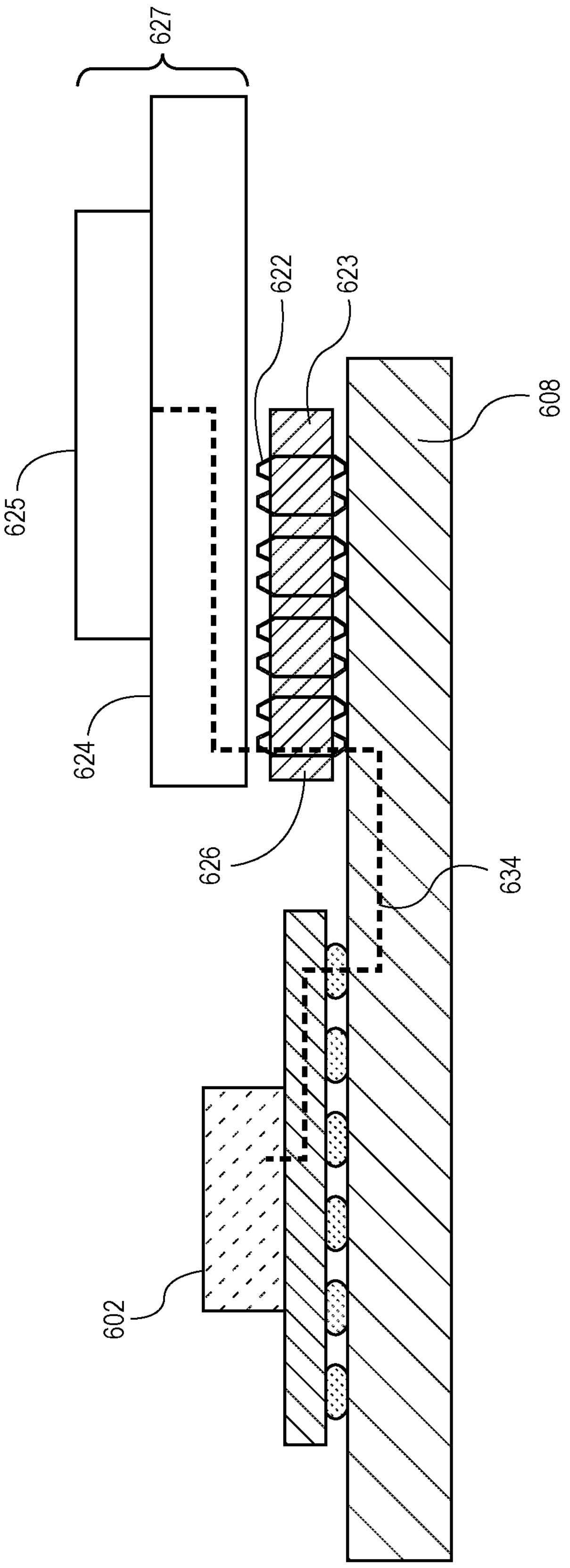
FIG. 6 illustrates an example of a compressed footprint DIMM connector with staggered pin orientation.

FIG. 6 illustrates an example of a compressed footprint DIMM connector with staggered pin orientation. Like FIG. 1B, the compressed connector 626 of FIG. 6 has a smaller footprint compared to a standard DDR5 connector. A CPU 602 and a component 627 are coupled with a motherboard 608. The component 627 is coupled with the motherboard via the connector 626. The connector 626 is closer to the CPU than typical DIMM connectors, and also motherboard routing space is reduced compared to conventional DIMM connectors. The component 627 may include one or more devices 625 mounted on a PCB or card, or other component that may be installed on a motherboard via a connector with staggered pin orientation. In one example, the component 627 may include a memory module such as a DIMM 624 with a plurality of DRAM chips 625 mounted on the PCB of the DIMM. In one example, the DIMM has a compressed size (a compressed DIMM). In one example in which the component is a DIMM, the DIMM 624 is installed in a direction parallel to the motherboard 608 via the connector 626 (e.g., via a right angle insert). Therefore, the connector 626 could be referred to as a right angle connector. The connector includes mechanical retentions to compress the connector to connect with the module and motherboard. The connector 626 includes a socket or other opening or slot for receiving the component 624. The dotted line 634 shows an example of a path of a signal between the CPU 602 and the component 624.

Unlike the connector of FIG. 1A, the pins 622 of FIG. 6 have a consistent shape. The pins 622 are housed in connector housing 623. The footprint of the connector on the motherboard is smaller than the conventional connector illustrated in FIG. 1A. The pins 622 of the compressed connector are also shorter relative to the pins 112 of FIG. 1A, which may result in less crosstalk in the compressed connector. However, the pins of the compressed connector 626 are close together, resulting in additional sources of crosstalk compared to the conventional SO-DIMM connector.

In one example, the pins 622 of the connector 626 are arranged in multiple rows in close proximity, resulting in some pins having more than two aggressors (such as shown in FIG. 2, described above). The staggered pin orientation can significantly reduce the crosstalk amongst signal pins of the connector.

Figure 7:
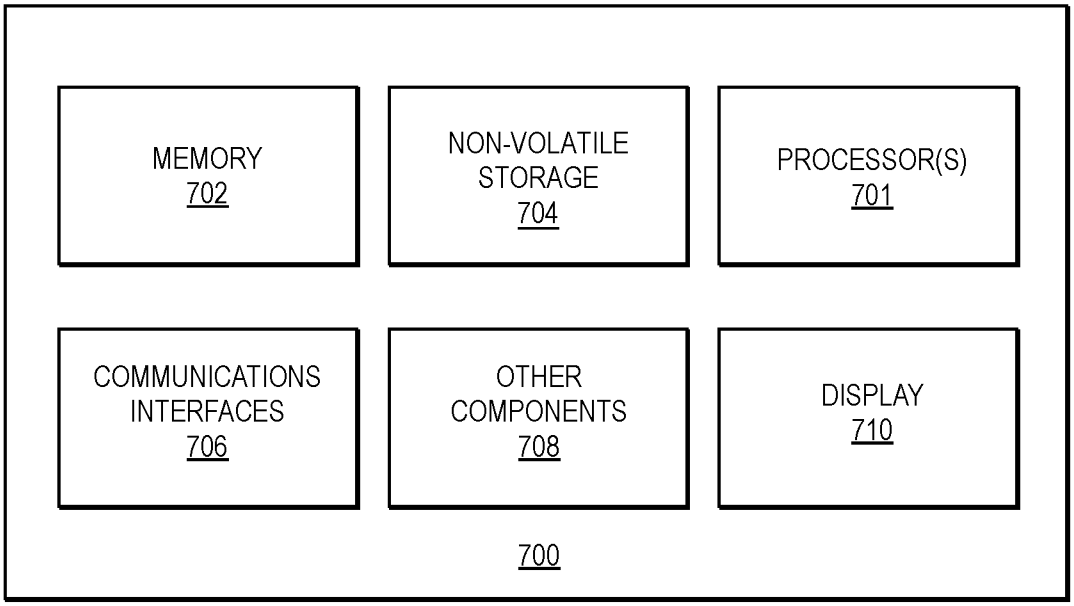
FIG. 7 provides an exemplary depiction of a computing system that may include a connector as described herein.

FIG. 7 provides an exemplary depiction of a computing system 700 in which a connector with a staggered pin orientation can be implemented. The computing system 700 can be, for example, user equipment, a computer, a personal computer (PC), a desktop computer, a laptop computer, a notebook computer, a netbook computer, a tablet, a smart phone, embedded electronics, a gaming console, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. The system 700 may include a motherboard onto which components may be mounted. As observed in FIG. 7, the system 700 includes one or more processors or processing units 701 (e.g., host processor(s)). The processor(s) 701 may include one or more central processing units (CPUs), each of which may include, e.g., a plurality of general-purpose processing cores. The processor(s) 701 may also or alternatively include one or more graphics processing units (GPUs) or other processing units. The processor(s) 701 may include memory management logic (e.g., a memory controller) and I/O control logic. The processor(s) 701 typically include cache on a same package or near the processor.

The system 700 also includes memory 702 (e.g., system memory). The system memory can be in the same package (e.g., same SoC) or separate from the processor(s) 701. The system 700 can include static random-access memory (SRAM), dynamic random-access memory (DRAM), or both. In some examples, memory 702 may include volatile types of memory including, but not limited to, RAM, D-RAM, DDR SDRAM, SRAM, T-RAM or Z-RAM. One example of volatile memory includes DRAM, or some variant such as SDRAM. Memory as described herein may be compatible with a number of memory technologies, such as DDR4 (Double Data Rate (DDR) version 4, JESD79-4, initial specification published in September 2012 by JEDEC), LPDDR4 (LOW POWER DOUBLE DATA RATE (LPDDR) version 4, JESD209-4, originally published by JEDEC in August 2014), LPDDR5 (LPDDR version 5, JESD209-5, originally published by JEDEC in February 2019), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, JESD79-5 initial specification published in July 2020 by JEDEC), LPDDR5 (LPDDR version 5, currently in discussion by JEDEC), HBM2 (HBM version 2, currently in discussion by JEDEC), and/or others, and technologies based on derivatives or extensions of such specifications. In one example, the memory 702 includes a byte addressable DRAM or a byte addressable non-volatile memory such as a byte-addressable write-in-place three dimensional crosspoint memory device, or other byte addressable write-in-place non-volatile memory devices (also referred to as persistent memory), such as single or multi-level Phase Change Memory (PCM) or phase change memory with a switch (PCMS), NVM devices that use chalcogenide phase change material, resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory may be packaged as one or more DIMMs to be inserted into a connectors as described herein.

The system 700 also includes communications interfaces 706, a display (e.g., touchscreen, flat-panel) 710, and other components 708. The other components may include, for example, a power supply (e.g., a battery or/or other power supply), sensors, power management logic, or other components. The communications interfaces 706 may include logic and/or features to support a communication interface. For these examples, communications interface 706 may include one or more input/output (I/O) interfaces that operate according to various communication protocols or standards to communicate over direct or network communication links or channels. Direct communications may occur via use of communication protocols or standards described in one or more industry standards (including progenies and variants). For example, I/O interfaces can be arranged as a Serial Advanced Technology Attachment (SATA) interface to couple elements of a node to a storage device. In another example, I/O interfaces can be arranged as a Serial Attached Small Computer System Interface (SCSI) (or simply SAS), Peripheral Component Interconnect Express (PCIe), or Non-Volatile Memory Express (NVMe) interface a storage device with other elements of a node (e.g., a controller, or other element of a node). Such communication protocols may be utilized to communicate through I/O interfaces as described in industry standards or specifications (including progenies or variants) such as the Peripheral Component Interconnect (PCI) Express Base Specification, revision 3.1, published in November 2014 ("PCI Express specification" or "PCIe specification") or later revisions, and/or the Non-Volatile Memory Express (NVMe) Specification, revision 1.2, also published in November 2014 ("NVMe specification") or later revisions. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification. Other examples of communications interfaces include, for example, a local wired point-to-point link (e.g., USB) interface, a wireless local area network (e.g., WiFi) interface, a wireless point-to-point link (e.g., Bluetooth) interface, a Global Positioning System interface, and/or other interfaces.

The computing system 700 also includes non-volatile storage 704, which may be the mass storage component of the system. Non-volatile types of memory may include byte or block addressable non-volatile memory such as, but not limited to, NAND flash memory (e.g., multi-threshold level NAND), NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), three-dimensional (3D) cross-point memory structure that includes chalcogenide material and/or phase change material, or a combination of any of the above. For these examples, storage 704 may be arranged or configured as a solid-state drive (SSD). The data may be read and written in blocks and a mapping or location information for the blocks may be kept in memory 702. The non-volatile memory may be packaged as one or more DIMMs to be inserted into a connectors as described herein.

The computing system 700 may also include one or more accelerators or other computing devices. For example, the computing system 700 may include an Artificial Intelligence (AI) or machine learning accelerator optimized for performing operations for machine learning algorithms, a graphics accelerator (e.g., GPU), or other type of accelerator. An accelerator can include processing circuitry (analog, digital, or both) and may also include memory within the same package as the accelerator. Accelerators may be mounted on cards to be inserted into connectors such as the connectors described herein.

Examples of Connectors with Staggered Pin Orientation Follow.

Example 1: A connector to couple a card or module to a motherboard includes connector housing and a plurality of pins. Each of the plurality of pins including two ends including a card or module-facing end to couple with the card or module and a motherboard-facing end to couple with the motherboard. Each of the plurality of pins including a middle section in the connector housing, wherein one or both of the ends include one or more bends relative to the middle section. The plurality of pins includes alternating signal pins and ground pins. The signal pins have an opposite orientation relative to the ground pins.

Example 2: A connector in accordance with example 1, wherein the signal pins include single-ended input/output (I/O) pins.

Example 3: A connector in accordance with one or more of examples 1 and 2, wherein: the card or module includes one or more of a memory module, a dual-in line memory module (DIMM), a graphics card, and an accelerator.

Example 4: A connector in accordance with one or more of examples 1, 2, and 3, wherein: each of the plurality of pins has an identical shape.

Example 5: A connector in accordance with one or more of examples 1, 2, 3, and 4 wherein: the middle section of a pin is parallel to the middle section of the other pins of the plurality.

Example 6: A connector in accordance with one or more of examples 1, 2, 3, 4, and 5 wherein: each of the plurality of pins has a C-shape.

Example 7: A connector in accordance with one or more of examples 1, 2, 3, 4, 5, and 6, wherein: the middle section of each of the plurality of pins is straight and orthogonal to the motherboard.

Example 8: A connector in accordance with one or more of examples 1, 2, 3, 4, 5, and 6, wherein the middle section of each of the plurality of pins includes one or more protrusions.

Example 9: A connector in accordance with one or more of examples 1, 2, 3, 4, 5, 6, 7, and 8, wherein: one or both of the ends of each of the plurality of pins include a flat section parallel to the motherboard.

Example 10: A connector in accordance with one or more of examples 1, 2, 3, 4, 5, 6, 7, 8, and 9, wherein: one or both of the ends of each of the plurality of pins extend further from an axis of the middle section than any protrusion in the middle section.

Example 11: A connector in accordance with one or more of examples 1, 2, 3, 4, 5, 6, 7, 8, 9, 10, wherein: a length of each of the plurality of pins is greater than a distance between the ends and an axis along the middle section.

Example 12: A connector in accordance with one or more of examples 1, 2, 3, 4, 5, 6, 7, 8, 9, 10, and 11, wherein: the distance of the ends from the axis is between 10-50% of the length of each of the plurality of pins.

Example 13: A connector in accordance with one or more of examples 1, 2, 3, 4, 5, 6, 7, 8, 9, 10, 11, and 12, further including a socket to receive and retain the card or module parallel to the motherboard.

Example 14: A connector in accordance with one or more of examples 1, 2, 3, 4, 5, 6, 7, 8, 9, 10, 11, 12, and 13, wherein: the plurality of pins includes multiple rows of evenly spaced pins, and the middle section of a pin in a row is closer to the middle section of a first adjacent pin in the row than the middle section of a second adjacent pin in the row.

Example 15: A connector in accordance with one or more of examples 1, 2, 3, 4, 5, 6, 7, 8, 9, 10, 11, 12, 13, and 14, wherein: the plurality of pins include more than two rows of pins.

Example 16: A connector in accordance with one or more of examples 1, 2, 3, 4, 5, 6, 7, 8, 9, 10, 11, 12, 13, 14, and 15, wherein: the plurality of pins includes more 3-8 rows of pins.

Example 17: A memory module connector to couple a memory module to a motherboard, the memory module including: connector housing, and a plurality of pins. Each of the plurality of pins includes two ends including a memory module-facing end to couple with the memory module and a motherboard-facing end to couple with the motherboard. Each of the plurality of pins includes a middle section in the connector housing, wherein the ends of each of the plurality of pins bend away from the middle section. The plurality of pins includes alternating signal pins and ground pins, the signal pins having an opposite orientation relative to the ground pins.

Example 18: A memory module connector of example 17, and further in accordance with one or more of examples 2-16.

Example 19: A system including a motherboard, and a connector coupled with the motherboard. The connector includes connector housing and a plurality of pins. Each of the plurality of pins includes two ends including a card or module-facing end to couple with a card or module and a motherboard-facing end to couple with the motherboard. Each of the plurality of pins includes a middle section in the connector housing, wherein one or both of the ends bends away from the middle section. The plurality of pins includes alternating signal pins and ground pins, the signal pins having an opposite orientation relative to the ground pins.

Example 20: A system in accordance with example 19, further including one or more of: a processor, a memory module, a power supply, and a battery.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A connector to couple a card or module to a motherboard, the connector comprising:

connector housing; and a plurality of pins, each of the plurality of pins including two ends including a card or module-facing end to couple with the card or module and a motherboard-facing end to couple with the motherboard, wherein:

each of the plurality of pins includes a middle section in the connector housing, wherein one or both of the ends include one or more bends relative to the middle section, and the plurality of pins includes alternating signal pins and ground pins, the signal pins having an opposite orientation relative to the ground pins.

2. The connector of claim 1, wherein:

the signal pins include single-ended input/output (I/O) pins.

3. The connector of claim 1, wherein:

the card or module includes one or more of a memory module, a dual-in line memory module (DIMM), a graphics card, and an accelerator.

4. The connector of claim 1, wherein:

each of the plurality of pins has an identical shape.

5. The connector of claim 1, wherein:

the middle section of a pin is parallel to the middle section of other pins of the plurality.

6. The connector of claim 1, wherein:

each of the plurality of pins has a C-shape.

7. The connector of claim 1, wherein:

the middle section of each of the plurality of pins is straight and orthogonal to the motherboard.

8. The connector of claim 1, wherein:

the middle section of each of the plurality of pins includes one or more protrusions.

9. The connector of claim 1, wherein:

one or both of the ends of each of the plurality of pins include a flat section parallel to the motherboard.

10. The connector of claim 1, wherein:

one or both of the ends of each of the plurality of pins extend further from an axis of the middle section than any protrusion in the middle section.

11. The connector of claim 1, wherein:

a length of each of the plurality of pins is greater than a distance between the ends and an axis along the middle section.

12. The connector of claim 11, wherein:

the distance of the ends from the axis is between 10-50% of the length of each of the plurality of pins.

13. The connector of claim 1, further including:

a socket to receive and retain the card or module parallel to the motherboard.

14. The connector of claim 1, wherein:

the plurality of pins comprising multiple rows of evenly spaced pins; and the middle section of a pin in a row is closer to the middle section of a first adjacent pin in the row than the middle section of a second adjacent pin in the row.

15. The connector of claim 1, wherein:

the plurality of pins includes more than two rows of pins.

16. The connector of claim 15, wherein:

the plurality of pins includes more 3-8 rows of pins.

17. A memory module connector to couple a memory module to a motherboard, the memory module connector comprising:

connector housing; and a plurality of pins, each of the plurality of pins including two ends including a memory module-facing end to couple with the memory module and a motherboard-facing end to couple with the motherboard, wherein:

each of the plurality of pins includes a middle section in the connector housing, wherein the ends of each of the plurality of pins bend away from the middle section, and the plurality of pins includes alternating signal pins and ground pins, the signal pins having an opposite orientation relative to the ground pins.

18. The memory module connector of claim 17, wherein:

the plurality of pins comprises multiple rows of evenly spaced pins; and the middle section of a pin in a row is closer to the middle section of a first adjacent pin in the row than the middle section of a second adjacent pin in the row.

19. A system comprising:

a motherboard; and a connector coupled with the motherboard, the connector including:

connector housing; and a plurality of pins, each of the plurality of pins including two ends including a card or module-facing end to couple with a card or module and a motherboard-facing end to couple with the motherboard, wherein:

each of the plurality of pins includes a middle section in the connector housing, wherein one or both of the ends bends away from the middle section, and the plurality of pins includes alternating signal pins and ground pins, the signal pins having an opposite orientation relative to the ground pins.

20. The system of claim 19, further comprising one or more of:

a processor, a memory module, a power supply, and a battery.

* * * * *